Nov. 13, 1923.   O. A. HOKANSON   1,473,705
CONTROL MECHANISM FOR TYPEWRITERS
Filed Feb. 28, 1920   2 Sheets-Sheet 1
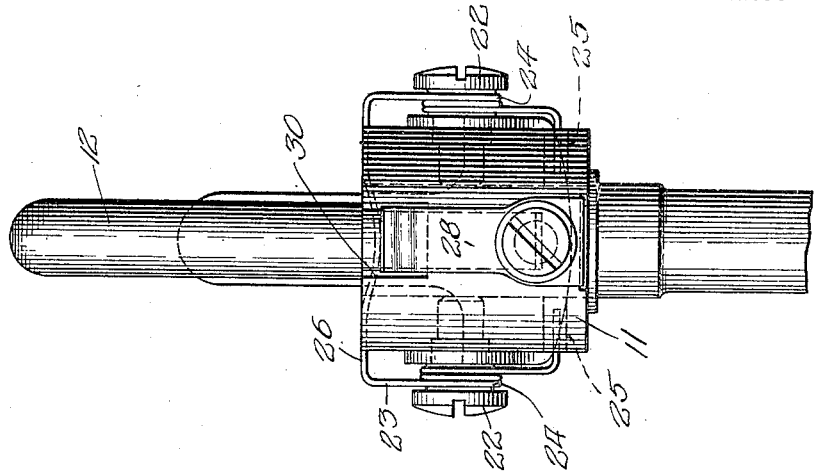
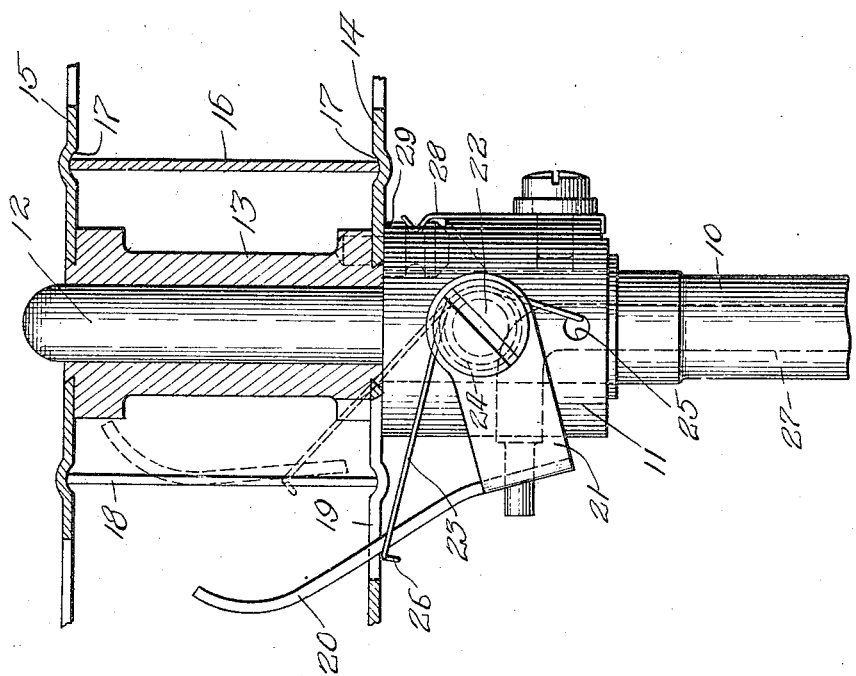

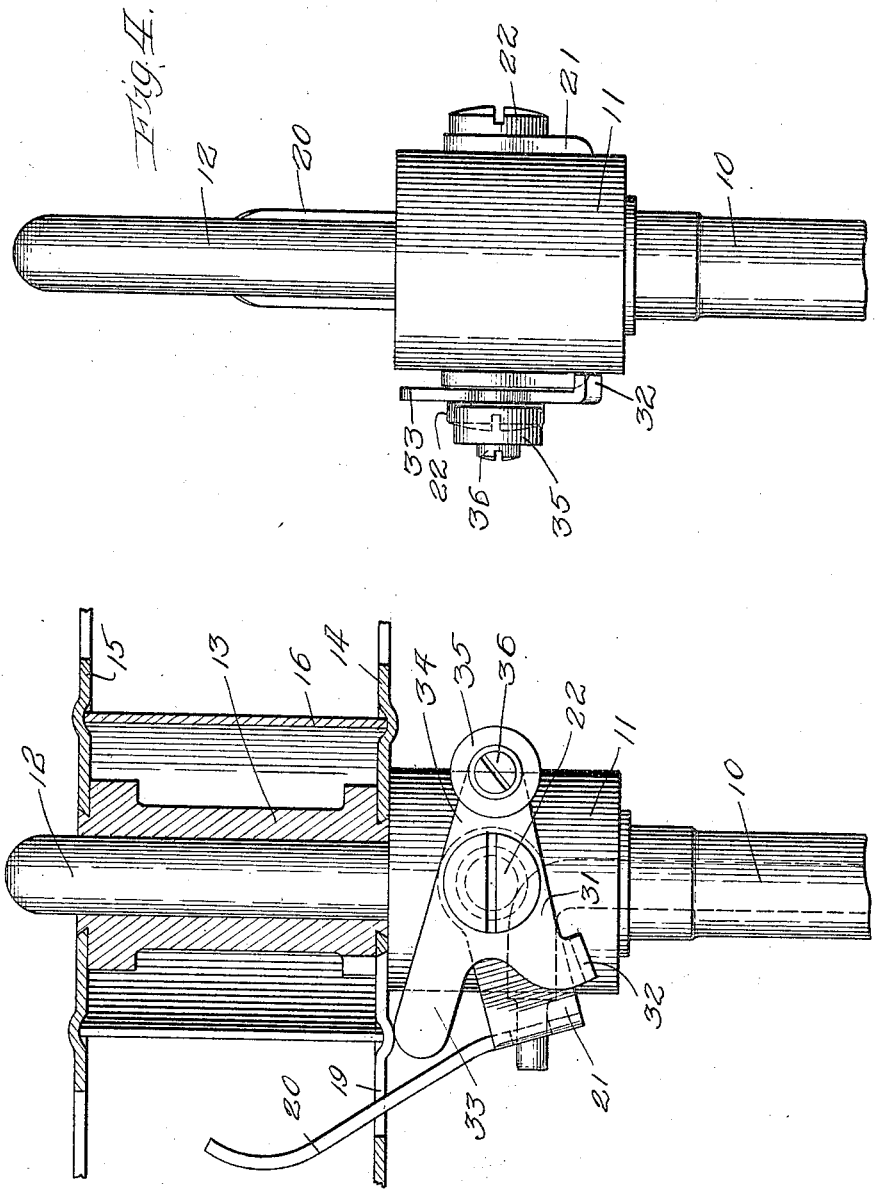

Patented Nov. 13, 1923.

1,473,705

UNITED STATES PATENT OFFICE.

OTTO A. HOKANSON, OF WOODSTOCK, ILLINOIS, ASSIGNOR TO WOODSTOCK TYPE-WRITER COMPANY, OF WOODSTOCK, ILLINOIS, A CORPORATION OF ILLINOIS.

CONTROL MECHANISM FOR TYPEWRITERS.

Application filed February 28, 1920. Serial No. 361,923.

*To all whom it may concern:*

Be it known that I, OTTO A. HOKANSON, a citizen of the United States, residing at Woodstock, in the county of McHenry and State of Illinois, have invented certain new and useful Improvements in Control Mechanism for Typewriters, of which the following is a specification.

This invention has for its object the provision of ribbon spools which shall be of improved construction and operation.

The invention is exemplified in the combination and arrangement of parts shown in the accompanying drawings and described in the following specification, and it is more particularly pointed out in the appended claim.

In the drawings—

Fig. 1 is a fragmentary sectional view of a typewriter ribbon spool and the mounting therefor;

Fig. 2 is a view looking from the right in Fig. 1 with the spool removed; and

Figs. 3 and 4 are views similar to Figs. 1 and 2, respectively, of a modified form.

The numeral 10 designates a ribbon spool shaft having an enlarged portion or collar 11 and a spindle 12 for receiving a ribbon spool. The ribbon spool is provided with a core 13 carrying flanges 14 and 15 at the ends thereof. A cylindrical sheet metal sleeve 16 is held in place in circular grooves 17 in the inner faces of the flanges 14 and 15 and forms the spool proper upon which the ribbon is wound. The sleeve 16 and the lower flange 14 are slotted, as shown at 18 and 19, respectively, to receive a finger 20 carried by a yoke 21 mounted on pivots 22 carried by the enlarged portion 11 of the ribbon spool shaft 10. A wire spring 23 has opposite portions wound about the pivot pins 22, as shown at 24, and the ends of the spring 23 are bent inwardly and extended into openings 25 in the sleeve 11. The transversely extending portion 26 of the spring 23 engages the finger 20 and tends to move it upwardly into the position shown in broken lines in Fig. 1. When the spool is in place on the spindle 12 the spring 23 is held in the position shown in full lines in Fig. 1 by engagement with the bottom face of the lower flange 14 of the spool. This permits the finger 20 to drop backwardly into full line position shown in Fig. 1 when the ribbon has been completely unwound from the spool. When the ribbon is wound upon the spool the finger 20 is held in the position shown in broken lines by the ribbon, but the spring 23 remains in the position shown in full lines in Fig. 1 as long as the spool is in place upon the spindle 12. The movement of the finger 20 from broken to full line positions operates a rod 27 extending downwardly through the ribbon spool shaft 10 to control the ribbon reversing mechanism, not shown. The ribbon spool is normally held in place on the spindle 12 by a spring catch 28 which engages a stud 29 extending downwardly from the core 13 into an opening 30 in the sleeve 11.

When it is desired to remove the ribbon spool for replacing a worn out ribbon, or for any other purpose, the operator grasps the spool and pulling upwardly frees the pin 29 from the spring 28 and draws the spool from the spindle 12. This will free the spring 23 from contact with the lower face of the flange 14 and permit the spring to move upwardly and carry the finger 20 into the position shown in broken lines in Fig. 1. This will prevent operation of the ribbon reversing mechanism while the spool is removed from the spindle and will also hold the finger 20 in a position in which the spool may be readily replaced upon the spindle without any manipulation of the finger by the operator. As the spool is replaced upon the spindle the lower flange of the spool will again engage the spring 23 and force it back into its full line position shown in Fig. 1 so that when the ribbon has been unwound from the spool the finger 20 may drop backwardly and downwardly to operate the ribbon reversing mechanism.

In the form of the invention shown in Figs. 3 and 4 the spring 23 is omitted and a plate 31 is pivotally mounted on the stud 22 and is provided with a laterally bent lug 32 which projects beneath the yoke 21. An arm 33 is provided on the plate 31 and extends upwardly into position to engage the lower flange 14 of the ribbon spool at one side of the slot 19. The plate 31 is also provided with an arm 34 projecting on the side of the pivot 22 opposite the arm 33 and having a weight 35 secured thereto by a screw 36. When the ribbon spool is removed from the spindle 12 the weight 35 drops downwardly and causes the lug 32 to engage the lower edge of the yoke 21 and lift the yoke. This shifts the finger 20 toward the spindle 12 in a manner similar to the action of the spring 23 previously described so that the finger is in position to permit return of the ribbon spool to the spindle. The operation of the weighted member 31 is similar to that of the spring 23, except that the movement of the finger 20 is produced by the action of gravity upon the weight 35 instead of by spring tension.

I claim:—

The combination with a ribbon spool shaft having an enlarged portion thereon arranged to form a spool-supporting shoulder, a bracket pivoted on said enlarged portion and having a finger carried thereby and extending into position to enter a slot in a spool on said shaft, a spring wire coiled about the pivot for said bracket and bent to engage said finger to move said finger inwardly toward said shaft into position to permit a spool to be placed upon said shaft, said spring being arranged to be held out of engagement with said finger by a spool on said shaft, and means for retaining a spool in position upon said shaft.

In testimony whereof I have signed my name to this specification on this 24th day of February, A. D. 1920.

OTTO A. HOKANSON.